United States Patent [19]

Geiser et al.

[11] Patent Number: 4,648,239
[45] Date of Patent: Mar. 10, 1987

[54] BALING MACHINE

[75] Inventors: Jens Geiser, Zweibrucken, Fed. Rep. of Germany; Jean Viaud, Sarreguemines, France

[73] Assignee: Deere & Company, Moline, Ill.

[21] Appl. No.: 858,467

[22] Filed: May 1, 1986

[30] Foreign Application Priority Data

May 13, 1985 [GB] United Kingdom ............... 8512087

[51] Int. Cl.[4] ............................................. A01D 39/00
[52] U.S. Cl. ....................................... 56/341; 100/88; 56/1
[58] Field of Search ................ 56/341, DIG. 1, 1; 100/88, 89, 152, 188 R, 180

[56] References Cited

U.S. PATENT DOCUMENTS

| | | | |
|---|---|---|---|
| 4,172,354 | 10/1979 | Vermeer et al. | 56/341 |
| 4,176,596 | 12/1979 | Sacht | 56/341 |
| 4,182,101 | 1/1980 | Gaeddert et al. | 56/341 |
| 4,228,638 | 10/1980 | Rabe et al. | 56/341 |
| 4,422,374 | 12/1983 | Campbell et al. | 56/341 |
| 4,436,027 | 3/1984 | Freimuth et al. | 56/341 |
| 4,510,741 | 4/1985 | Campbell et al. | 56/341 |
| 4,581,879 | 4/1986 | Anstey | 56/341 |

Primary Examiner—Gene Mancene
Assistant Examiner—John G. Weiss

[57] ABSTRACT

A baling machine, towed by a tractor, for forming large cylindrical bales of hay has a baling chamber defined by oppositely moving runs of belts trained over rolls.

In order to avoid stray hay wrapping round the ends of one of the rolls supporting the belts and then being ingested in bearings supporting opposite ends of the roll, a scraper assembly is provided at each end of the roll. The assemblies each comprise a spiral which is welded to the roll and which moves the stray crop away from the end of the roll, and a scaper in light contact with the spiral preventing the crop being carried round the roll by the spiral. Possible crop buildup at the scraper in wet conditions is reduced further by an auger which is disposed just above the scraper and which is driven, e.g. by one of the belts, to move crop away from the scraper.

12 Claims, 6 Drawing Figures

BALING MACHINE

BACKGROUND OF THE INVENTION

This invention relates to a machine for harvesting crop having rotatable rolls contactable by the crop and having a scraper assembly associated therewith for preventing the crop from being carried round the roll. The machine can be a baling machine, for forming cylindrical bales of crop, having a main frame on which the rolls are mounted to provide a baling chamber for the crop.

Machines, towed by a tractor, for forming large cylindrical bales of hay (so called "round" balers) are well known. As the machine advances, the crop is removed from a windrow by a pickup mechanism and delivered rearwardly to a baling chamber where it is rolled into a bale between sets of oppositely moving belts, the growing bale rotating about a horizontal axis and the baling chamber expanding with the bale. The belts are trained over rolls which extend laterally of the machine and most of which are journalled at either end in the sides of the machine.

During baling, stray crop can become entrapped in the region between the sides of the baler, the outermost belts and the rolls, whereupon the crop tends to wrap round the roll ends which can be detrimental to belt tracking on the rolls. The crop can also find its way into the bearings of the rolls and foul them.

In U.S. Pat. No. 4,399,746 granted to Viaud on Aug. 23, 1983 there is described and claimed a baling machine which is designed to obviate the wrapping of crop along the length of a roll. In one arrangement described, an additional roll is provided over which the belts are alternately trained to give a staggered array with openings between the belts enabling stray crop to escape.

It is also known, e.g. from U.S. Pat. No. 4,155,298, to provide a scraper along the length of a roll in very close proximity to the roll surface to scrape off the wrapping crop, but although this may work well in some crop conditions if the roll is very accurately formed, it is not so satisfactory if these circumstances do not apply.

In our co-pending U.S. patent application Ser. No. 701,587 filed by Anstey on Feb. 13, 1985 (now U.S. Pat. No. 4,581,879) and having the same assignee as the instant case, there is described and claimed an invention which reduces the problem of crop wrapping round rolls and is particularly useful when used to protect the end of the rolls. It can be employed in conjunction with the invention of U.S. Pat. No. 4,399,746 or independently.

According to the invention of U.S. application Ser. No. 701,587 the scraper assembly includes an elongated member rigid with the roll and extending along it, the scraper being in contact with the member or closely spaced therefrom. The elongated element, which is preferably in the form of a spiral for moving the crop along the roll, can be machined more easily and with greater accuracy than the roll.

The present invention enables the further reduction in wrapping or buildup of crop which may still be experienced in wet difficult conditions.

SUMMARY OF THE INVENTION

According to the present invention, there is provided an improved scraper assembly for preventing harvested crop from wrapping about a roll employed in a harvester in a crop handling environment. More specifically, there is provided an improvement over a scraper assembly of the type disclosed in the aforementioned U.S. application Ser. No. 701,586.

An object of the invention is to provide a scraper assembly which will effectively prevent crop from wrapping about a harvester roll and for moving the crop away from bearings supporting opposite ends of the roll.

A more specific object is to provide a scraper assembly for reducing the wrapping of crop about and being ingested in the bearing of a roll and including a spiral bar fixed on the roll, a scraper disposed adjacent to the spiral bar and an auger located adjacent the scraper.

A further object is to provide a scraper assembly which may be easily retrofit onto existing crop harvesting machines.

These and other objects will become apparent from a reading of the ensuing description together with the appended drawings.

DESCRIPTION OF THE PREFERRED EMBODIMENT

Figure 1:
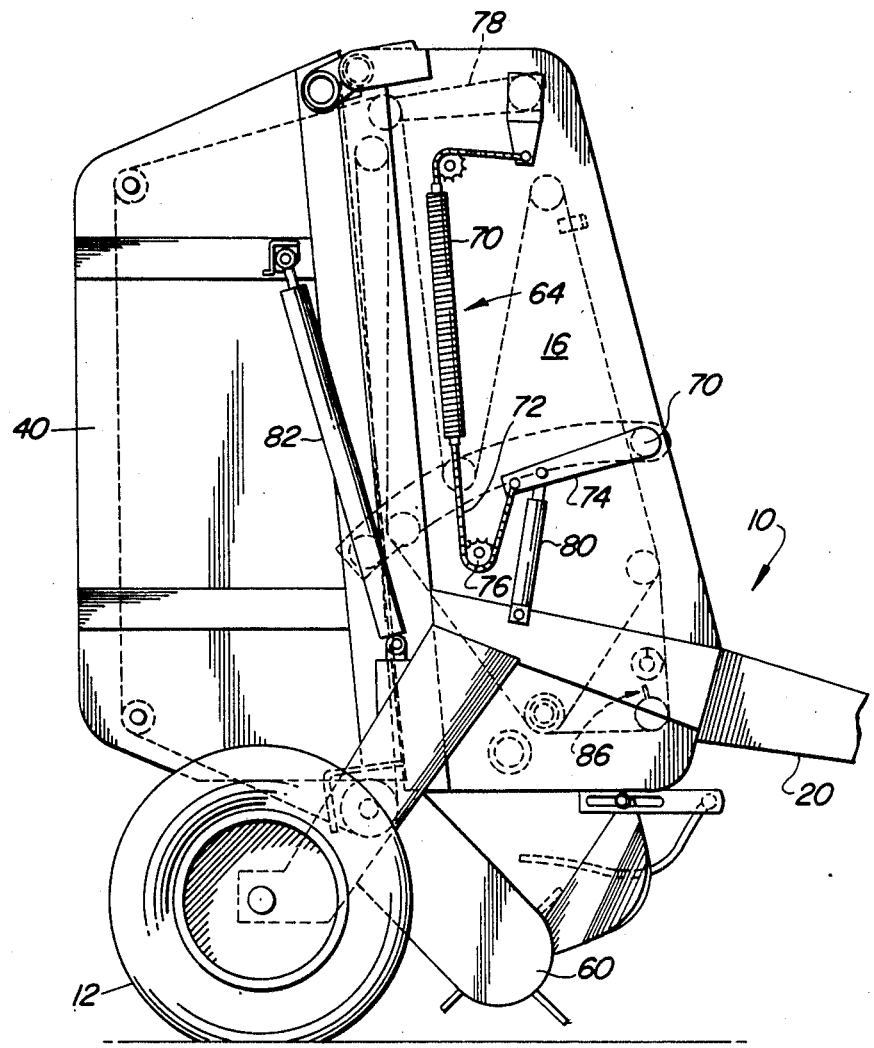
FIG. 1 is an elevational view of the right hand side (considered when facing the direction of advancement) of a baling machine for forming large cylindrical bales of hay or straw showing in broken lines the disposition of the transverse rolls and belts trained round the rolls within the machine, and also a scraper assembly associated with a lower foremost roll.

In the drawings (and particularly in FIGS. 1 and 2), the machine includes a main frame 10 mounted on a pair of wheels 12, 14. The main frame 10 has a pair of upright, opposite, fore-and-aft extending right and left side walls 16, 18 connected by transverse beams. A draft tongue 20 is rigid with a cross beam 21 at the front of the frame 10 and extends forwardly for attaching the baler to a tractor (not shown) which draws the machine.

Figure 2:
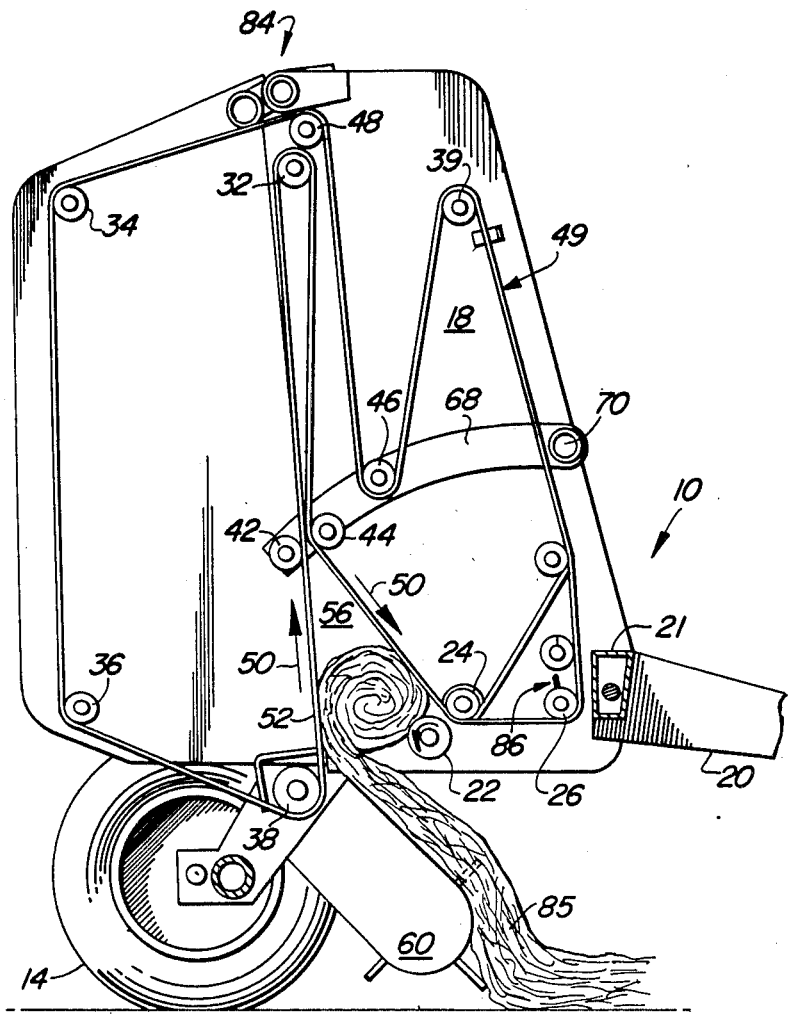
FIG. 2 is an elevational view similar to FIG. 1, but with the right hand side of the machine removed.

A plurality of lateral rolls, shown in broken lines in FIG. 1 and in full lines in FIG. 2, extends over the width of the machine. One set of rolls 22, 24, 26, 28, 30, 32 have their respective opposite ends respectively journalled in the side walls 16, 18, whilst a further set constituted by rolls 34, 36, 38 have their opposite ends respectively journalled in opposite walls of a rearward swingable gate portion 40 of the side walls. There is also a pair of chamber restricting rolls 42, 44, and take-up and tensioning rolls 46, 48.

Figure 3:
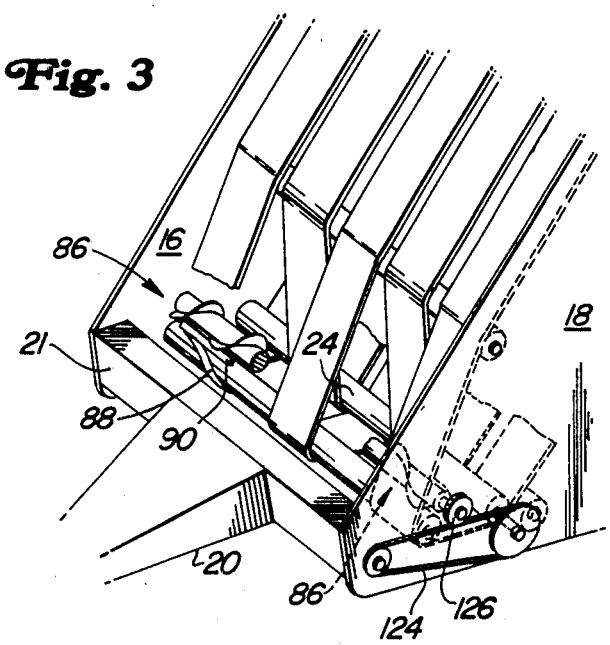
FIG. 3 is a left front perspective view of the machine showing scraper assemblies at the end portions of the lower foremost roll.

Five rubber belts 49 are trained side-by-side over the rolls, with the exception of the roll 22 which acts as a stripper roll, to provide the configuration shown in FIGS. 1 and 2 and they move in the direction indicated by arrows 50, the stripper roll 22 being driven anticlockwise as viewed in the two Figures. However, as best shown in FIG. 3, alternate belts only are trained over the lower foremost roll 26, whilst the remaining belts bypass the roll 26 and run directly between the roll 24, which is the same horizontal level as the roll 26, and the roll 28 which is spaced above the roll 26. This creates, as explained and claimed in the above-mentioned U.S. Pat. No. 4,399,746, a staggered array of belts affording the release of stray crop through gaps, formed as a result of the staggering, between neighboring belts. Upwardly extending runs 52, 54 of the belts provide with the side walls a bale-forming chamber 56 which has an inlet 58 for crop received from a pickup 60 located beneath the inlet.

In order to accommodate the increasing diameter of a growing bale core 62 in the bale-forming chamber 56, the size of the chamber must also increase and a belt take-up and tensioning mechanism 64 is provided for this purpose at each side of the machine. These mechanisms include: a pair of arms 66, 68 which are mounted on a horizontal transverse pivot shaft 70 at the forward end of the main frame 10. The take-up and tensioning roll 46 has its opposite ends respectively supported at an intermediate location on the arms 66, 68; and the pair of chamber restricting rolls 42, 44 have their opposite ends respectively supported at the free end of the arms. The arms are biased in an anticlockwise direction by a pair of springs, one on each side of the main frame 10 of which just the right hand spring 70 is shown and only its arrangement will be described, the other being similar. The spring 70 acts through a chain 72, at its lower end, on a bias arm 74 connected rigidly to the pivot shaft 70, the chain 72 being trained over a sprocket 76. At its upper end a further chain similarly connects the spring 70 to one end of a bell crank 78, and the other end of the bell crank bears one end of the take-up and tensioning roll 48. The bias arm 74 is also restrained by a piston and cylinder unit 80 pivotally connected at one end to the free end of the bias arm 74 and at the other to the associated right hand side wall 16 of the main frame 10. A similar arrangement is provided on the left hand side of the machine so that, for example, the roll 48 is carried by bell cranks on each side.

The rear gate portion 40 is movable by a pair of upwardly extending hydraulic piston and cylinder units on each side of the main frame 10 of which only a right hand unit 82 is shown, the unit 82 being pivotally connected at its lower end to the forward fixed portion of the side wall 16 and at its upper end to the gate portion 40 which is swingable upwardly and downwardly about a pivot arrangement 84 at its upper forward region.

In operation, crop lying in a windrow 85 is lifted and conveyed to the baling chamber 56 where the oppositely moving runs 52, 54 of the belts, aided by the stripper roll 22, cause the crop to turn clockwise (as viewed in FIGS. 1 and 2) to form the bale core 62 of increasing size which eventually overcomes the tension in the belts brought about by the tensioning mechanisms, and the arms 66, 68 consequently swing upwardly and thus the chamber 56 increases in size to accommodate the bale core 62 as its diameter grows.

During baling, crop sometimes finds its way past the edges of the belts of the runs 52, 54 to the exterior of the bale chamber 56. Much stray crop forward of the baling chamber tends to escape due to the staggered array of belts as mentioned above, but some crop can nevertheless sometimes wrap round the roll 26 at its ends where it can be ingested into bearings of the roll or cause problems in belt tracking. The difficulties are exacerbated if the crop is wet.

Figure 4:
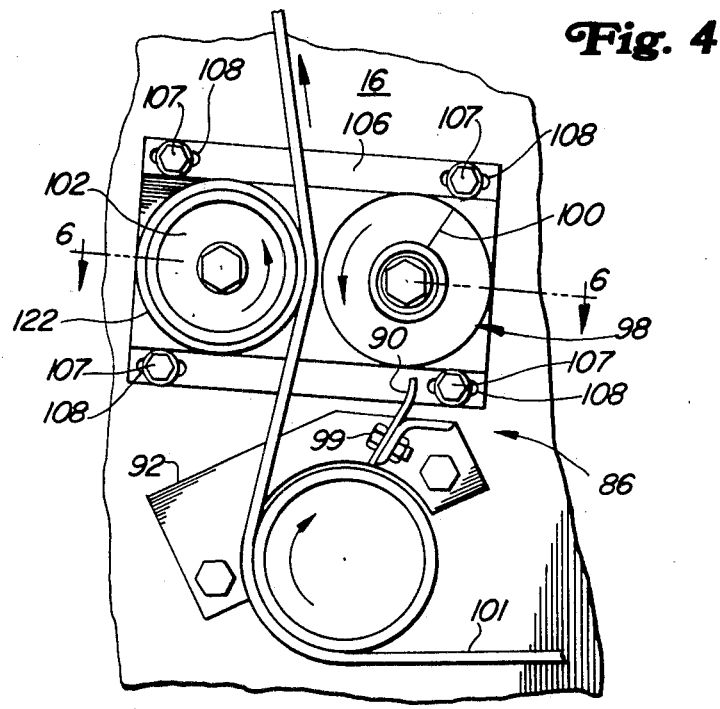
FIG. 4 is a vertical cross-sectional view taken through the lower foremost roll just to the left of the rightmost belt in FIG. 3 looking toward the right hand side of the machine, but with a scraper assembly that is driven in a different way from that in FIGS. 1 to 3.

In order to reduce wrapping of crop at the ends of the roll 26 a scraper assembly 86 is provided at the right hand end of the roll 26, a corresponding assembly 86 being located at the other end. The right hand assembly 86 illustrated includes (as shown in FIGS. 3 and 4) a spiral 88, a scraper 90, and a mounting plate 92 for the scraper. The mounting plate 92 has a semicircular bite taken from its lower side to accommodate the cylindrical surface of the roll 26 so that the plate straddles the roll, and it is apertured to receive the shanks of two bolts 96 which secure it to the inside face of the right side wall 16. The scraper 90 is attached to the plate 92 by way of a V-shaped support 97 welded to, and running at right angles from, the plate so that the scraper 90 extends horizontally over the upper surface of the right hand end portion of the roll 26. The scraper 90 is bolted to the support 97 which is provided with adjustment slots (not shown) for the bolts, e.g. for bolt 99. The spiral 88 is formed from circular cross-section rod of which is 5 mm in diameter or from rectangular cross-section rod of which the width is 20 mm and the height is 5 mm and the spiral is welded to the end portion of the roll 26, its hand being such as to tend to convey crop inwardly on rotation of the roll in the anticlockwise direction as viewed in FIG. 1 (i.e. the spiral is right handed). The scraper 90 is adjusted on the support 97 to bring the scraper into light contact, or just out of contact, with the spiral 88. An end belt 101 of the belts 49 is trained over the spiral 88 which extends somewhat beyond the inner edge of the belt.

Figure 5:
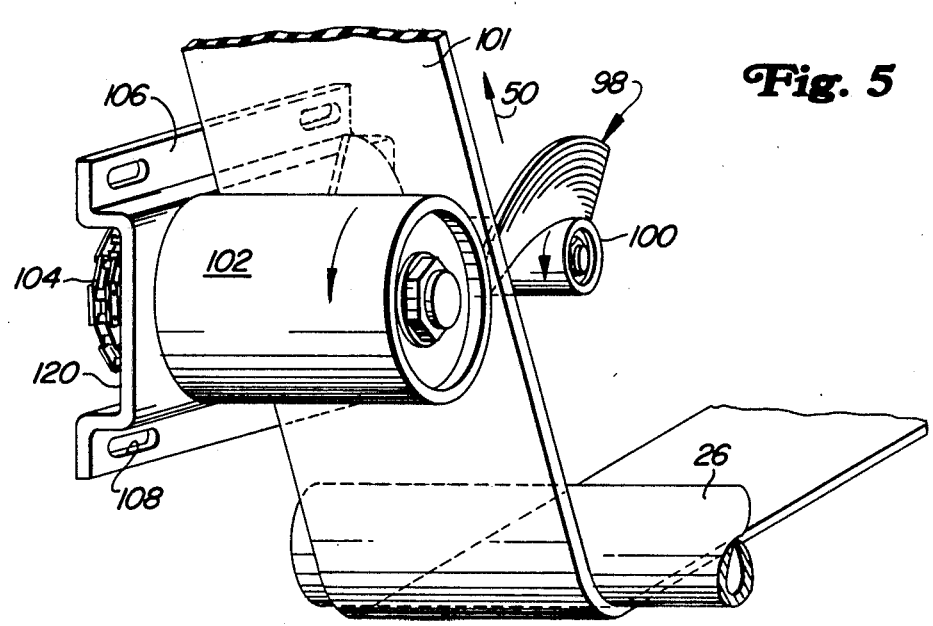
FIG. 5 is an elevational view of the drive arrangement of the scraper assembly of FIG. 4 with part of the scraper assembly removed.
Figure 6:
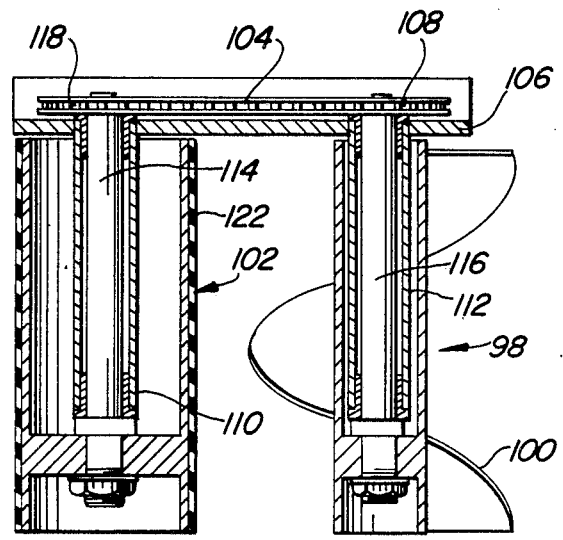
FIG. 6 is a cross section taken on the line 6—6 of FIG. 4, but with the belt omitted.

Each scraper assembly also includes an auger arrangement 98 of which that in FIGS. 1 to 3 differs somewhat from that in FIGS. 4 to 6. Referring firstly to the latter Figures, the arrangement 98 is disposed above the scraper 90 and has an auger 100, a drive roll 102 for the auger 100, a drive chain 104 between the drive roll and the auger, and a support plate 106 for the drive roll and auger. In more detail, the support plate 106 is attached to the right side wall 16 by bolts 107 running through adjustment slots 108 in the plate and carries rigid with it in cantilever fashion a drive roll support cylinder 110 and an auger support cylinder 112 which extend inwardly. Journalled within cylinders 110 and 112 are a drive roll shaft 114 and an auger shaft 116 respectively which are rigid with the drive roll 102 and the auger 100. The inner ends of the two shafts 114, 116 carry sprockets 118 for the drive chain 104 which connects them. The drive chain 104 and sprockets 118 are accommodated in a recess 120 formed on the outer side of the support plate 106.

The support plate 106 is adjusted to bring the roll 102 into firm frictional driving contact with the forward side of the belt 101, and in order to ensure a high grip the roll 102 is provided with a rubber surface layer 122. The auger 100 is disposed on the rearward side of the belt 101. Viewing the scraper 90 facing its left end as in FIG. 4, initially the scraper extends outwardly from the roll 26 at an angle of approximately 45° to the vertical and finally its outer end portion is vertical terminating just short of the underside of the auger 100 roughly in the vertical plane of the axis of the auger.

The auger arrangement 98 in FIGS. 1 to 3 differs from that in FIGS. 4 to 6 in that the auger 100 is arranged to be driven not from one of the belts 49 but from a chain drive 124 for the rolls, only the left hand chain drive being shown in FIG. 3. A sprocket 126 on a shaft 128 engages the chain drive 124 and the drive is transmitted to the auger 100 which is on the shaft 128.

As indicated above the scraper assemblies 86 at the left and right hand ends of the roll 26 correspond. The spirals 88 are, of course, of opposite hand as are the augers 100.

The scraper assemblies 86 operate by conveying any stray crop tending to wrap round the end portion of the roll 26 away from the end. Specifically the spirals 88 serve to convey the crop and the scrapers 90 to prevent crop being carried round by the spirals. The augers 100 are so disposed relative to the scrapers 90 and are of such a hand that they move any crop, tending to accumulate in the region of the scrapers, away from the scrapers in an inward direction. At the exit ends of the spirals and augers the crop is free to fall through the gap between neighboring belts.

Of the two drive arrangements mentioned above for the augers 100 that in FIGS. 4 to 6 has flexibility in citing on the machine in that it is independent of the main chain drive to the rolls, but that in FIGS. 1 to 3 provides a very positive, efficient drive.

Instead of two separate augers 100 being provided for the roll 26 a single auger, driven at one end only, may be used, the auger flights being of opposite hand at the end portions of the auger. The scraper and elongated member can also extend over the full length of the roll.

As indicated in the aforementioned U.S. patent application Ser. No. 701,586, the scraper can be in the form of a spiral mounted on a frame separate from the roll 26 whilst the roll has straight rods which extend parallel to the axis of the roll and are welded thereto.

Although the scraper assemblies have been described as being located at the end regions of the roll 26, they can alternatively or in addition be provided for other rolls wherever wrapping is likely and where the unwanted stray crop can be moved away from the site of wrapping.

We claim:

1. In a machine for harvesting crops having rotatable rolls located for coming into contact with crop, and having opposite ends supported in bearings, a scraper assembly associated with at least one roll for preventing crop from wrapping about the roll and said scraper assembly including an elongate member rigid with the roll and extending along it and a scraper generally paralleling said roll and having an edge disposed at least very close to said elongate member, the improvement comprising: an auger disposed adjacent the scraper so as to move crop away from the scraper.

2. A machine according to claim 1 in which the machine is a baling machine for forming cylindrical bales of crop having a main frame on which the rolls are mounted to provide a baling chamber for the crop.

3. A machine according to claim 1 in which the elongated member is formed from a rod.

4. A machine according to claim 1 or 3 in which the elongated member comprises a spiral.

5. A machine according to any of claim 1 in which said scraper assembly is provided at both end regions of said one roll in the vicinity of the bearings therefor.

6. A machine according to claim 2 in which said one roll is the lower foremost roll of the baling machine.

7. A machine according to claim 2 in which the baling chamber is defined by belts trained over the rolls, and drive means for the auger being drivingly coupled to one of a said belts.

8. A machine according to claim 7 in which said drive means for the auger includes a drive roll in frictional driving contact with said one belt, and driving connection means coupled between the drive roll and the auger.

9. A machine according to claim 8 in which the said driving connection means includes a chain drive to the auger.

10. A machine according to claim 9 in which the drive roll and the auger are mounted in cantilever fashion on a common support.

11. A machine according to claim 2 in which the baling chamber is defined by belts trained over the rolls and in which said one roll is chain driven and the auger is in driving connection with the chain drive.

12. In a crop harvesting machine including a roll located in a crop contacting location and a scraper assembly associated with said roll for preventing crop from wrapping about said roll and including a scraper having an edge disposed adjacent said roll and a surface angled upwardly away from said roll, the improvement comprising: an auger located above and adjacent to said scraper for moving crop away from the scraper, and drive means coupled for rotating said auger.

* * * * *